(No Model.) 2 Sheets—Sheet 1.

C. G. KERR.
MOWER.

No. 591,230. Patented Oct. 5, 1897.

Witnesses.
M. McDonald
Charles Marien

Inventor:
Charles G. Kerr.
by Thurman & Silvius,
Attorneys.

(No Model.) 2 Sheets—Sheet 2.

C. G. KERR.
MOWER.

No. 591,230. Patented Oct. 5, 1897.

Witnesses.
M. McDonald
Charles Marien

Inventor:
Charles G. Kerr,
by Thurman & Silvius,
Attorneys.

UNITED STATES PATENT OFFICE.

CHARLES GASTON KERR, OF INDIANAPOLIS, INDIANA.

MOWER.

SPECIFICATION forming part of Letters Patent No. 591,230, dated October 5, 1897.

Application filed January 13, 1896. Serial No. 575,336. (No model.)

*To all whom it may concern:*

Be it known that I, CHARLES GASTON KERR, a citizen of the United States, residing at Indianapolis, in the county of Marion and State of Indiana, have invented certain new and useful Improvements in Mowers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a new and improved arrangement of parts embraced in a horse-power mowing-machine; and it consists of certain devices for transmitting motion and power to the knife-bar, by which many serious objections heretofore found in such mowers are obviated, as will be fully explained in detail hereinafter.

As at present constructed the parts in mowing-machines which connect and give motion to the cutting-knife are very unreliable on account of improper design, which causes frequent breakages and excessive wear of the bearing parts or moving connections. My object is to eliminate all of these objectionable features, and have provided a mower which is reliable, simple in design, of few parts, cheaply manufactured, and durable in use.

Figure 1:
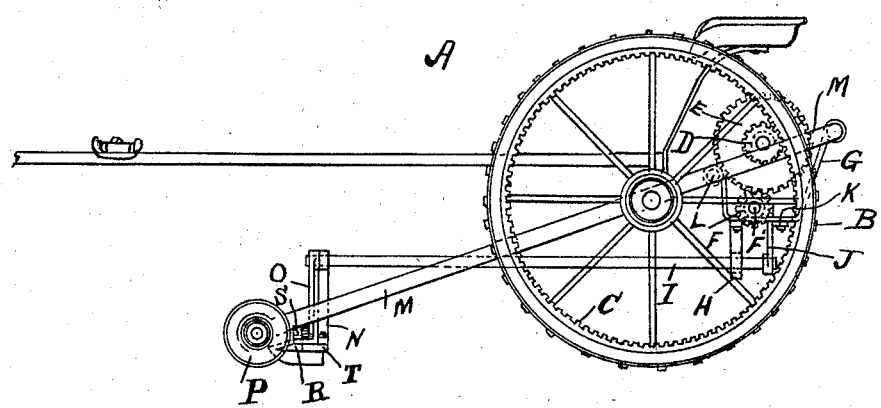
Figure 2:
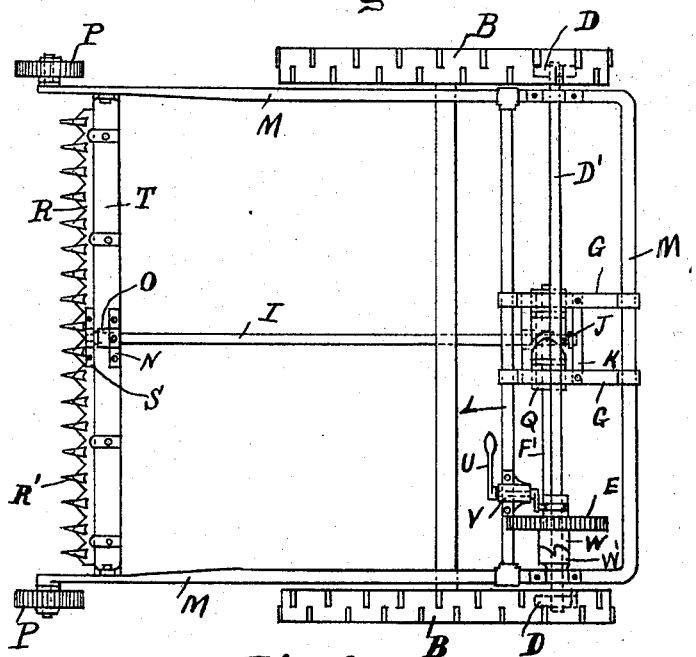
Figure 3:
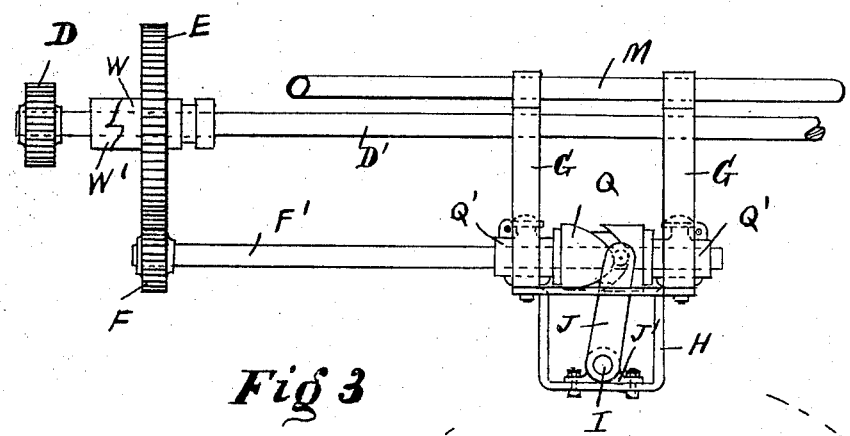
Figure 4:
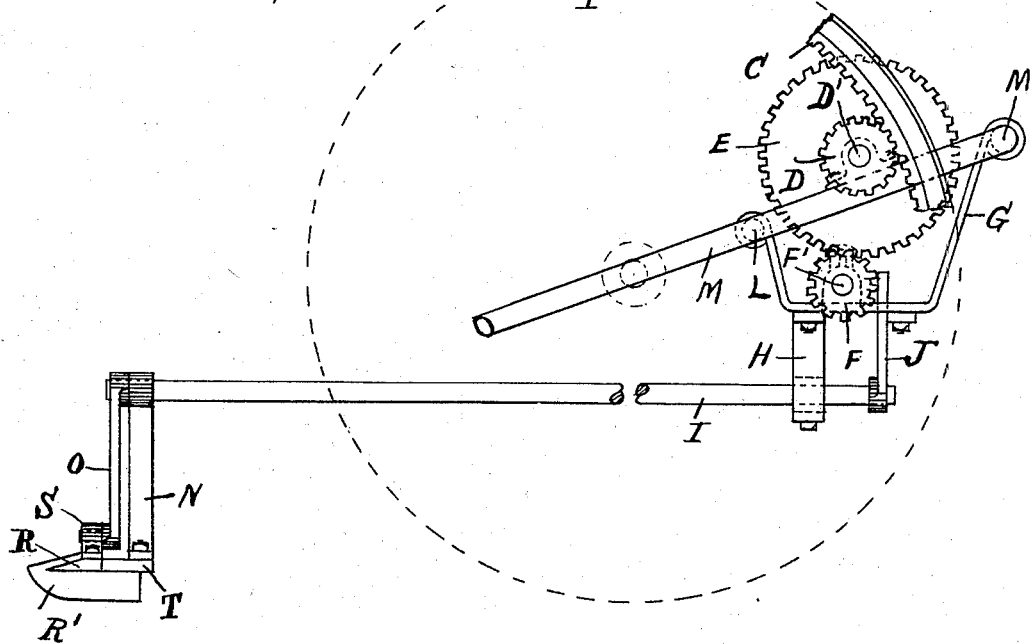

Referring to the accompanying drawings, Figure 1 represents a side view of a mower embodying my invention. Fig. 2 is a plan view. Fig. 3 is a rear view of parts in detail; and Fig. 4 is a side view of parts in detail, the latter two views enlarged somewhat to make each part better understood.

In the drawings, A is a mower.

B B are the main carrying-wheels, supporting the main frame and having the internal gear C, engaging the pinions D, which are secured to the shaft D', mounted on the frame M.

E is the gear-wheel, having the half of the clutch W attached to one side of its hub revoluble on shaft D' and engaging with the pinion F, which is secured to the shaft F', suitably mounted.

G G are parts of the frame attached to the main frame M.

H is a drop-bracket or part of the frame attached to the frame-piece G, supporting in a journal-box J' the rear end of the rocking shaft I.

J is a rocking arm attached at its lower end to the rear end of the shaft I, while its upper end has secured to it a roller-pin which travels in the slot of the cam Q, attached to the shaft F', which revolves in the journal-boxes Q' Q', secured to the frame-pieces G G.

K is a brace tying the two frame-pieces G G together to prevent vibration or spreading.

L is a cross-piece of the main frame.

N is a standard supporting the forward end of the shaft I and is bolted at its base to the knife holder or carrier T, to which is attached the finger-guards R' of the cutting-knife R.

O is a rocking arm secured at its upper end to the forward end of the shaft I, and at its lower end, on a wrist-pin secured thereto, is connected a box-bracket S, which is secured to the knife-bar.

P P are the small carrying-wheels, supporting the cutter-bar and forward part of frame with attachments.

U is a lever carried in a journal-box V, attached to the frame-piece L, having attached to it a shaft which has at its farther end a crank and pin, the latter engaging in a groove in the outside of the extended hub of the gear-wheel E, by which, when manipulated, the said gear-wheel is engaged or disengaged with the other part of the clutch W', which is secured to the shaft D'.

In constructing my mower all parts are designed and proportioned to give the requisite amount of strength and wearing qualities in each part. All parts are made of the most durable metals, and yet are light and strong.

In practical operation the main wheels or drive-wheels transmit motion to the pinions D, gear-wheel E, pinion F, shaft F', and cam Q, the slot in which causes the rocking arm J to move backward and forward with a steady motion and without jarring, rotating the shaft I, the rocking arm O, and giving a reciprocating motion to the cutting-knife R. The motion being transmitted to the knife-bar at its center prevents undue friction and gives it a steady vibratory motion. It is obvious that such construction is of great advantage over those machines in which the knife is connected at one end to defective or unstable devices or in which the rocking shaft is actuated by objectionable jerking mechanism.

I am aware that patents have been granted for certain appliances for mowing-machines embodying parts used in my machine, but differing in details of construction and combination, and I hereby disclaim them as separate devices.

Having described my invention, what I claim, and desire to secure by Letters Patent of the United States, is—

In a power mowing-machine, the combination of the frame M L suitably mounted and having the knife-bar carrier attached to the forward ends thereof; the hangers G G depending from said frame and supporting the shaft F'; the cam Q secured to said shaft F' between said hangers; the drop-bracket H supported by said hangers; the standard N attached to said knife-bar carrier; the rocking shaft I journaled at its forward end on said standard and at its rear end on said drop-bracket; the rocking arm O secured to the forward end of said rocking shaft and connecting the knife-bar; the rocking arm J secured to the rear end of the shaft I and having at its upper end a pin engaging the groove of said cam, by which a vibratory motion is imparted to said arm, with means for rotating said shaft F', substantially as shown and described.

In testimony whereof I affix my signature in presence of two witnesses.

CHARLES GASTON KERR.

Witnesses:
M. McDONALD,
E. T. SILVIUS.